United States Patent
Holighaus et al.

(10) Patent No.: US 6,913,333 B2
(45) Date of Patent: *Jul. 5, 2005

(54) SWITCH CABINET WITH A RACK

(75) Inventors: Heiko Holighaus, Eschenburg (DE); Gerhard Müller, Slegen (DE); Samuel Klassen, Haiger (DE); Michael Diebel, Dillenburg (DE)

(73) Assignee: Rittal GmbH & Co. KG, Herborn (DE)

( * ) Notice: Subject to any disclaimer, the term of this patent is extended or adjusted under 35 U.S.C. 154(b) by 42 days.

This patent is subject to a terminal disclaimer.

(21) Appl. No.: 10/194,432

(22) Filed: Jul. 12, 2002

(65) Prior Publication Data

US 2004/0007950 A1 Jan. 15, 2004

(51) Int. Cl.$^7$ .................................................. A47F 5/00
(52) U.S. Cl. ............................... 312/265.4; 312/265.3; 312/223.1
(58) Field of Search ........................... 312/265.1–265.6, 312/213, 223.1, 400, 401, 406; 211/26, 189, 182; 361/829; 174/50, 60

(56) References Cited

U.S. PATENT DOCUMENTS

| | | | | |
|---|---|---|---|---|
| 2,980,482 A | * | 4/1961 | Baio | 312/265.1 |
| 5,775,051 A | * | 7/1998 | Nicolai et al. | 52/731.1 |
| 5,971,511 A | * | 10/1999 | Diebel et al. | 312/265.3 |
| 6,164,985 A | * | 12/2000 | Reuter | 439/92 |
| 6,238,028 B1 | * | 5/2001 | Benner et al. | 312/265.3 |
| 6,348,656 B1 | * | 2/2002 | Thielmann et al. | 174/50 |
| 6,401,940 B1 | * | 6/2002 | Hartel et al. | 211/26 |
| 6,533,373 B2 | * | 3/2003 | Reuter et al. | 312/223.6 |
| 6,640,980 B2 | * | 11/2003 | Klassen et al. | 211/26 |

FOREIGN PATENT DOCUMENTS

| | | | |
|---|---|---|---|
| DE | 26 56 943 | | 6/1978 |
| DE | 195 03 801 | | 5/1996 |
| DE | 195 07 731 | | 5/1996 |
| DE | 19811713 | * | 6/1999 |
| DE | 198 17 163 | | 3/2000 |
| DE | 10132979 | * | 10/2002 |
| DE | 10132980 | * | 10/2002 |
| DE | 10113893 | * | 12/2002 |

* cited by examiner

Primary Examiner—Janet M. Wilkens
(74) Attorney, Agent, or Firm—Pauley Peterson & Erickson

(57) ABSTRACT

A switch cabinet with a rack that can be closed or is closed by at least one double-walled cabinet door, three side walls, a top wall and a bottom wall, where the side walls each has an internal wall and an external wall and are attached to the rack. With a special angling-off of the internal wall for the side walls and the back wall, a completely sealed and shielded internal space of the switch cabinet is produced, wherein the rigid attachment of the internal walls and the external walls is accomplished from outside the supported interior of the switch cabinet.

14 Claims, 1 Drawing Sheet

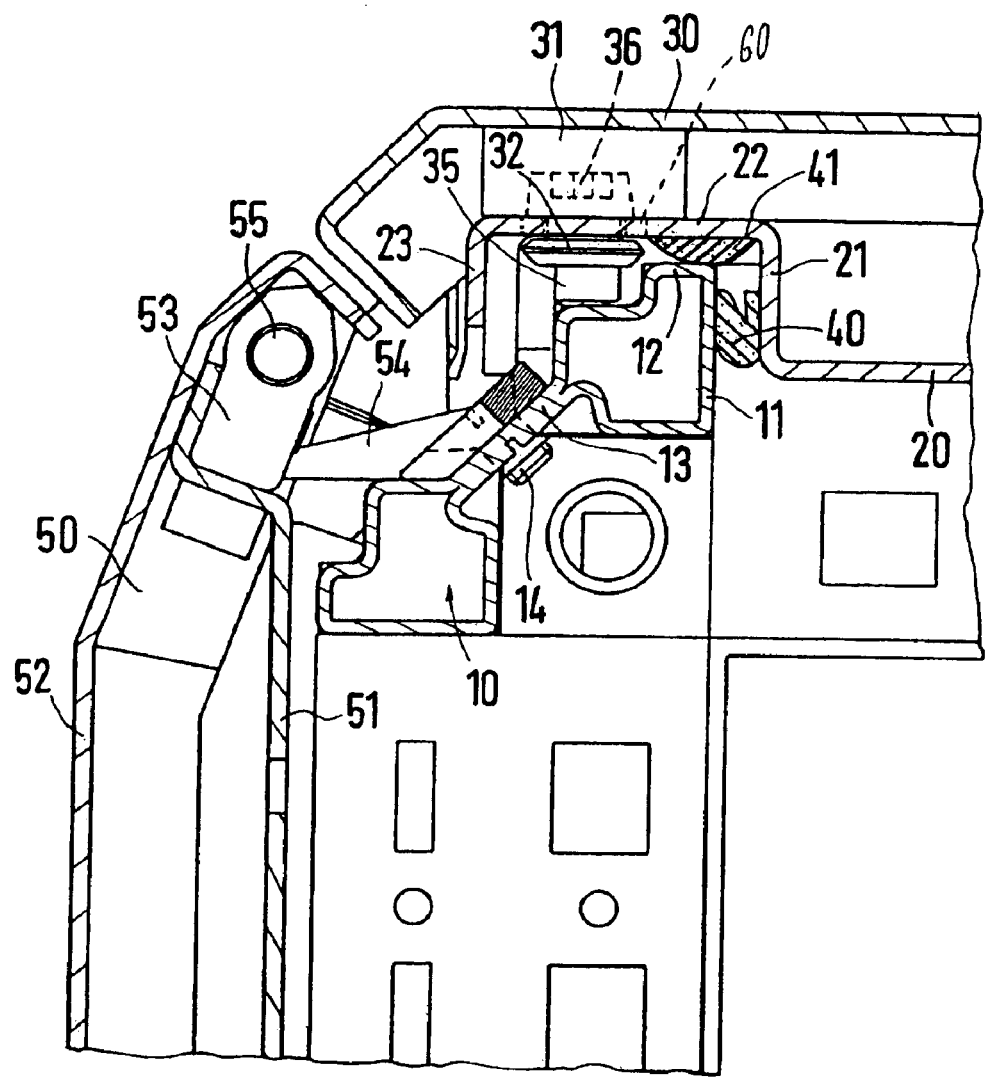

SWITCH CABINET WITH A RACK

BACKGROUND OF THE INVENTION

1. Field of the Invention

This invention relates to a switch cabinet with a rack that can be closed or is closed by a double-walled cabinet door, three side walls, a top wall and a bottom wall, wherein the side walls each has an internal wall and an external wall and are attached to the rack.

2. Discussion of Related Art

Switch cabinets are primarily used in the open air, where the double-walled design of the sheathing of the rack increases safety against vandalism, and the spaces formed between the internal and the external walls, in connection with the cover hood, improve ventilation.

In order to not provide attachment points for the double walls that are accessible from the outside and that can be disconnected, the internal wall is attached to the internal side of the external wall, and the assembled double wall is connected to the rack from the interior space. This type of attachment of double walls as the side walls and as the back wall of the switch cabinet is not only complicated, but also it limits the internal and external design and the design of the seal of the double wall at the rack.

SUMMARY OF THE INVENTION

One object of this invention is to provide, in a switch cabinet of the type mentioned above, an attachment of the internal wall and the external wall to the rack that can be accomplished from the outside, that has no attachment places that are accessible from the outside, that offers the possibility of providing a seal against water sprays, and that presents electromagnetic shielding of the connections between the rack and the internal wall.

This object is achieved according to this invention by at least the vertical frame legs, turned toward the side walls and the back wall, having an external profile section that is oriented toward and parallel to the side wall or back wall and an adjoining internal profile section that is perpendicular to it. The internal wall, at least on the vertical sides, has a shielding section which is angled-off toward the outside and which transitions to an attachment section that is oriented parallel to the internal wall. The attachment section extends into a free space in the external corner area of the vertical frame leg where it is mounted by an attachment element to an external attachment section of the frame leg piece, preferably by screws. The associated external wall in the external corner area is suspended in the attachment section of the internal wall and protected against being lifted out.

Between the internal wall and the rack, two gaps are formed by parallel sections of the frame leg and the internal wall angling-off to receive the sealing element and shielding element. The attachment of the internal wall to the rack, and the suspension points between the external wall and the internal wall, are placed outside of the sealing and shielding devices, so that the latter cannot be damaged. In addition, it is possible to vary the ventilation technology for the spaces between the internal and external wall of the side walls.

Sealing and shielding are facilitated because the shielding section of the internal wall supports an EMV shield element that is supported by the opposing internal profile section of the vertical frame leg, and because the attachment section of the internal wall carries a sealing element that is supported by the opposing external profile section of the vertical frame leg. Sealing and shielding are automatically carried out on both vertical sides of the internal wall by the attachment of the internal wall.

If the arrangement is such that the internal walls are equally angled-off at both the vertical sides as well as the upper and the lower sides, the horizontal frame legs that are turned upward are constructed in the same manner as the vertical frame leg and the sealing and shielding are carried out in the same manner as on the vertical sides, then the sealing and shielding provide closure on all sides.

The screw attachment of the internal wall to the frame leg is achieved, according to one embodiment, by the external attachment section of the frame leg for mounting the attachment element being shifted back with respect to the external profile section that determines the corresponding external side of the rack.

Hanging the external wall on the internal wall is easy to construct because the attachment section of the internal wall, in the region that extends over the external profile section of the frame leg, has vertically oriented keyholes as hanging recesses, and because as bolts one can suspend elements having bolt heads, where the elements are attached to the internal side of the external wall.

Hanging brackets that replace the keyhole can also be used on the internal wall.

If the arrangement is such that the external wall is hung, with contact, by its internal sides on the attachment section of the internal wall, then the double-walled design of such a construction of the side walls barely increases the external dimensions of the switch cabinet.

The spaces between the internal walls and the associated external walls can thus be increased simply by maintaining a distance between the internal side of the external wall and the attachment section of the internal wall. However, the external dimensions of the switch cabinet are increased.

For aeration of the spaces, according to one embodiment, the bottom sides of the internal wall and the external wall can form an air inlet opening, and the vertical side of the internal wall and the external wall can in each case form a ventilation gap.

In another embodiment, the internal wall and the external wall on the vertical side and the upper side enclose a ventilation space, and the external wall has air outlet openings.

According to one embodiment, securing the hanging places of the external walls is accomplished so that the upper side of the rack is closed with a top wall and near the back wall, a cover hood is pivotably connected to the rack, which cover hood, in its closed position, is supported on the upper edges of the suspended external walls, securing their suspended positions.

BRIEF DESCRIPTION OF THE DRAWING

This invention is further explained with reference to an embodiment shown in a partial cross section view, in the drawing.

DESCRIPTION OF PREFERRED EMBODIMENTS

In the drawing, the partial section shows a construction near or in the area of the vertical corner of the switch cabinet, with a vertical frame leg 10 to which a double-walled cabinet door 50 is hinged, and to which a double-walled side wall, formed by the internal wall 20 and the external wall 30, is attached.

The cabinet door 50, which has an internal wall 51 and an external wall 52, carries a hinge element 53 that is pin-jointed by a hinge bolt 55 to a counter hinge element 54. The vertical frame leg 10, which is symmetrical with respect to the rack diagonal, in the external area, forms a free space where the counter hinge element 54 is applied to the frame leg 10 by fastener 14. The cabinet door 50 is pivotably connected to the rack by several hinges.

According to this invention there is an angling-off of the vertical sides of the internal wall 20 and the opposing profile sections of the frame leg 10. An external profile section 12 of the frame leg 10 defines the external plane of the rack for the side wall to be put in place, which is adjoined by a cabinet door 50. An adjoining internal profile section 11, turned toward the internal wall 20, is perpendicular with respect to the external profile section 12. The internal wall 20 is angled-off on the vertical sides so that a shielding section 21, which is oriented toward the outside, runs parallel to, and at a small distance apart from the internal profile section 11 of the frame leg 10. The attachment section 22 of the internal wall 20 extends into the free space on the external side of the frame leg 10 and it ends in a reinforcement section 23, which again angles-off toward the interior, and which increases the rigidity of the edge region of the internal wall 20. Here the attachment section 22 covers the external profile section 12 of the frame leg 10 and it forms a second gap for receiving sealing element 41, which is applied to the attachment section 22 and which bears against the external profile section 12 of the frame leg 10. Thus, sealing and shielding are achieved between the rack and the internal wall 20. The features on the upper and lower side can be similar between the internal wall and the rack, as far as sealing and shielding are concerned. In that case, the cross section of the horizontal, opposing frame leg can also be chosen differently, so long as the gaps are formed appropriately and the attachment section 22 is extended beyond the external profile section 12 and can be used for the screw attachment to the frame leg, as shown in the connection elements 35 and 36 which are provided for screw attachment. Here the screw connection is effected to an external attachment section 13 of the frame leg 10. Several screw attachment places are provided in the attachment section 22 spread across the vertical sides of the internal wall 20. In between, vertically oriented keyholes 60 can be provided in the hanging receivers in the attachment section 22, into which receivers the bolts with bolt heads can be introduced as hanging elements 32. The hanging elements 32 are attached to the external wall 30 by block elements 31, and can be secured in corresponding keyholes 60 by lowering the external wall 30. Lowering can be achieved by application of a slight pressure on the external wall 30 from above. Attachment of the internal wall 20 and hanging of the external wall 30 thus occur outside of the sealed and shielded internal space of the switch cabinet.

The internal wall 20 extends into the reception space that is formed by the opposing frames from horizontal and vertical frame legs. If the external wall 30 is hung so that its internal side is applied against the external side of the attachment section 22, then as a result of the double-walled design of the side walls and the back wall the external dimensions of the switch cabinet are barely changed at all. The external wall 30, however, can be curved outward in order to increase the air space between the internal wall 20 and the external wall 30, and then the external dimensions of the switch cabinet change. Here the vertical end edges of the internal wall 20 and the external wall 30 can leave open gaps which serve as air outlet openings. If the internal wall 20 and the external wall 30 enclose a closed space on both vertical sides and the upper sides, then the external walls 30 can have air outlet openings, while on the bottom side, the internal wall 20 and the external wall 30 delimit an air inlet opening. It is precisely by the sealed and shielded application of the internal wall 20 to the rack that possibilities for varying the aeration of the side walls and the back wall are produced. The ventilation spaces can also open into a cover hood, which covers the upper side of the rack, which can be closed, in addition, with a top wall. If the cover hood is supported on the angled-in margins of the upper edge of the external walls 30, then the external walls 30 are secured in their closed positions. In this context, it is recommended to hinge the cover hood near or in the vicinity of the back wall, and to rigidly secure it in this closed position near or in the vicinity of the front side. In the open position of the cover hood, the external walls 30 can be hung on the internal walls 20 without difficulties. If the cover hood is closed, then the cover hood is supported on the bent-in parts or the edges of the upper side of the external walls 30, and thus prevents the unhanging of the external walls. For further security, the cabinet door can prevent opening of the cover hood.

What is claimed is:

1. In a switch cabinet having a rack closeable by a double-walled cabinet door and three side walls, where each of the side walls has an internal wall and an external wall and is attached to the rack the improvement comprising:
   vertical frame legs (10) turned toward the side walls and having an external profile section (12) and a perpendicularly positioned internal profile section (11);
   the internal wall (20) of each of the side walls having at least on vertical sides a shielding section (21) angled-off toward an outside and transitioning into an attachment section (22) oriented parallel to the internal wall (20);
   the attachment section (22) of each of te internal walls extending into a fee space in an external corner area of the respective vertical frame leg (10) where the attachment section is mounted by connection elements (35, 36) to one of the frame legs (10); and
   the external wall (30) of each of the side walls hung in the respective external corner area on the attachment section (22) of the respective internal wall (20) and secured against unhooking.

2. In the switch cabinet according to claim 1, wherein the shielding section (21) of each internal wall (20) carries an EMV shielding element (40) which is supported on the opposing internal profile section (11) of one of the vertical frame legs (10).

3. In the switch cabinet according to claim 2, wherein the attachment section (22) of each internal wall (20) carries a sealing element (41) which is supported on the opposing external profile section (12) of one of the vertical frame legs (10).

4. In the switch cabinet according to claim 3, wherein an external attachment section (13) of each of the frame legs (10) for positioning the attachment section (22) is shifted back with respect to the external profile section (12) that determines the corresponding external side of the rack.

5. In the switch cabinet according to claim 4, wherein the attachment section (22) of each internal wall (20) is in an area which extends beyond the external profile section (12) of the frame legs (10) and includes vertically oriented keyholes as hanging recesses, into which are suspended hanging elements formed as bolts with bolt heads, and the elements are attached to the internal side of the corresponding external wall (30).

6. In the switch cabinet according to claim 5, wherein the internal side of each external wall (30) is suspended on and contacted with the attachment section (22) of the corresponding internal wall (20).

7. In the switch cabinet according to claim 5, wherein each external wall (30) is secured to the corresponding attachment section (22) with the internal side at a distance from the attachment section (22) of the corresponding internal wall (20).

8. In the switch cabinet according to claim 7, wherein each internal wall (20) is evenly angled-off, on the vertical sides, upper sides and lower sides, horizontal frame legs turned upward are designed similar to the vertical frame legs (10), and sealing and shielding are similarly accomplished on the horizontal side.

9. In the switch cabinet according to claim 1, wherein the attachment section (22) of each internal wall (20) carries a sealing element (41) which is supported on the opposing external profile section (12) of one of the vertical frame legs (10).

10. In the switch cabinet according to claim 1, wherein an external attachment section (13) of each of the frame legs (10) for positioning the attachment section (22) is shifted back with respect to the external profile section (12) that determines the corresponding external side of the rack.

11. In the switch cabinet according to claim 1, wherein the attachment section (22) of each internal wall (20) is in an area which extends beyond the external profile section (12) of the frame legs (10) and including vertically oriented keyholes as hanging recesses, into which are suspended hanging elements formed as bolts with bolt heads, and the elements are attached to the internal side of the corresponding external wall (30).

12. In the switch cabinet according to claim 1, wherein the internal side of each external wall (30) is suspended on and contacted with the attachment section (22) of the corresponding internal wall (20).

13. In the switch cabinet according to claim 1, wherein each external wall (30) is secured to the corresponding attachment section (22) with the internal side at a distance from the attachment section (22) of the corresponding internal wall (20).

14. In the switch cabinet according to claim 1, wherein each internal wall (20) is evenly angled-off on the vertical sides, upper sides and lower sides, horizontal frame legs turned upward are designed similar to the vertical frame legs (10), and sealing and shielding are similarly accomplished on the horizontal side.

* * * * *